United States Patent
Orimoto et al.

(10) Patent No.: US 8,169,489 B2
(45) Date of Patent: May 1, 2012

(54) MULTI VIEW IMAGING DEVICE AND METHOD FOR CORRECTING IMAGE BLUR

(75) Inventors: Masaaki Orimoto, Saitama (JP); Shinji Matsushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/056,530

(22) PCT Filed: Jul. 29, 2009

(86) PCT No.: PCT/JP2009/063469
§ 371 (c)(1),
(2), (4) Date: Jan. 28, 2011

(87) PCT Pub. No.: WO2010/013733

PCT Pub. Date: Feb. 4, 2010

(65) Prior Publication Data
US 2011/0141297 A1 Jun. 16, 2011

(30) Foreign Application Priority Data
Jul. 31, 2008 (JP) .................................. 2008-197654

(51) Int. Cl.
*H04N 5/228* (2006.01)
(52) U.S. Cl. ................... 348/208.4; 348/208.2; 348/143
(58) Field of Classification Search ............. 348/46–50, 348/208.99–208.2, 208.7
See application file for complete search history.

(56) References Cited

U.S. PATENT DOCUMENTS

| 5,786,847 | A | 7/1998 | Katayama et al. |
| 6,118,475 | A * | 9/2000 | Iijima et al. ..................... 348/42 |
| 6,580,448 | B1 * | 6/2003 | Stuttler ........................... 348/46 |
| 2007/0159535 | A1 | 7/2007 | Kumagai et al. |

FOREIGN PATENT DOCUMENTS

| CN | 1 918 902 A | 2/2007 |
| JP | 08-336165 A | 12/1996 |
| JP | 2003-092768 A | 3/2003 |
| JP | 2005-045328 A | 2/2005 |
| JP | 2007-033624 A | 2/2007 |
| WO | 2006/064751 A1 | 6/2006 |

OTHER PUBLICATIONS

International Preliminary Report on Patentability and Written Opinion, dated Mar. 17, 2011, issued in corresponding International Application No. PCT/JP2009/063469, 10 pages in English and Japanese.

* cited by examiner

*Primary Examiner* — Tuan Ho
(74) *Attorney, Agent, or Firm* — Sughrue Mion, PLLC (57) ABSTRACT

A multi view imaging device according to an aspect of the present invention detects vibration applied to a plurality of imaging means and corrects, for each of a plurality of imaging means, an image blur of a subject image taken by the imaging means caused by the vibration. The image blur is corrected to make the amounts of remaining blur of the image blur after the correction substantially the same among the plurality of imaging means. As a result, even if there are variations in operation characteristics and installation errors of image blur correction means arranged on the imaging means, an appropriate image blur correction can be performed for each imaging means. Since the amounts of remaining blur of the subject image after the image blur correction in the imaging means are substantially the same, a comfortable, natural parallax image that is good for eyes can be obtained.

8 Claims, 6 Drawing Sheets

MULTI VIEW IMAGING DEVICE AND METHOD FOR CORRECTING IMAGE BLUR

This application is a National Stage of International Application No. PCT/JP2009/063469 filed Jul. 29, 2009, claiming priority based on Japanese Patent Application No. 2008-197654 filed Jul. 31, 2008, the contents of all of which are incorporated herein by reference in their entirety.

TECHNICAL FIELD

The present invention relates to a multi view imaging device and a method for correcting image blur, and particularly, to a multi view imaging device and a method for correcting image blur that correct a blur of a subject image caused by vibration such as camera shake.

BACKGROUND ART

The following techniques are proposed as techniques of correcting a blur of an image caused by vibration in imaging of a multi-view image (three-dimensional image) using a multi view camera including a plurality of optical systems.

Patent Literature 1 describes an invention of using common image blur detection means to detect image blurs of a plurality of optical systems to reduce differences between vibration isolation characteristics caused by differences between the characteristics of the image blur detection means.

Patent Literature 2 describes an invention of cutting out and outputting part of images taken by left and right optical systems based on a motion vector and phase difference information of the images taken by the left and right optical systems to enable a high-quality stereoscopic view without a parallax gap or a vertical gap.

CITATION LIST

Patent Literature

PTL 1: Japanese Patent Application Laid-Open No. 2007-33624
PTL 2: Japanese Patent Application Laid-Open No. 2003-92768

SUMMARY OF INVENTION

Technical Problem

However, only the differences between the characteristics of the detection means are taken into consideration in the technique described in Patent Literature 1, and there is a problem that the variations in the characteristics of the vibration isolation means of the optical systems cannot be handled.

The technique described in Patent Literature 2 is cut-out correction, and there is a problem that the still image photographing cannot be handled.

The present invention has been made in view of the foregoing circumstances, and an object of the present invention is to provide a multi view imaging device that can obtain an excellent parallax image by reducing differences between vibration isolation characteristics caused by characteristic differences between optical systems or vibration isolation mechanisms. Another object of the present invention is to provide a method for correcting image blur for such multi view imaging device.

Solution to Problem

A first aspect of the present invention provides a multi view imaging device characterized by comprising: a plurality of imaging means, each comprising an imaging element that takes a subject image and an imaging optical system that forms the subject image on the imaging element; a blur detection means for detecting a vibration applied to the imaging means; image blur correction means, arranged on each of the plurality of imaging means, for applying a correction of removing an image blur of the subject image generated by the vibration detected by the blur detection means to each of the plurality of imaging means; and a control means for individually controlling each of the image blur correction means to make amounts of the image blur of the subject image (hereinafter, amounts of remaining blur) that cannot be removed by the correction by the image blur correction means substantially the same among the plurality of imaging means.

According to the multi view imaging device of the first aspect, the vibration applied to the plurality of imaging means is detected, and for each of the imaging means, an image blur of a subject image taken by the imaging means caused by the vibration is corrected. The image blur is corrected to make the amounts of remaining blur of the image blur after the correction substantially the same among the plurality of imaging means. As a result, even if there are variations in operation characteristics and installation errors of the image blur correction means arranged on the imaging means, an appropriate image blur correction can be performed for each imaging means. Since the amounts of remaining blur of the subject images after the image blur correction in the imaging means are substantially the same, a comfortable, natural parallax image that is good for eyes can be obtained.

A second aspect of the present invention provides the multi view imaging device according to the first aspect, characterized in that the control means includes a storage means for storing a preset adjustment value for each of the imaging means, the storage means for storing the adjustment value for reducing the amount of remaining blur of each of the imaging means, and controls each of the plurality of image blur correction means based on output of the blur detection means and the adjustment values of each of the imaging means stored in the storage means.

According to the multi view imaging device of the second aspect, the storage means stores the adjustment value that is for reducing the amount of remaining blur of each imaging means and that is preset for each imaging means, and the image blur of the subject image is corrected based on the output of the blur detection means and the adjustment value. As a result, the amounts of remaining blur of the image blur after the correction in all imaging means can be substantially the same.

A third aspect of the present invention provides the multi view imaging device according to the second aspect, characterized in that in the storage means, a first adjustment value for minimizing the amount of remaining blur is stored for first imaging means in which the amount of remaining blur is the largest among the plurality of imaging means, and a second adjustment value for making vibration isolation characteristics of the second image blur correction means substantially equal to vibration isolation characteristics of the first imaging means is stored for a second imaging means other than the first imaging means.

According to the multi view imaging device of the third aspect, the first adjustment value for minimizing the amount of remaining blur is recorded for the first imaging means in which the amount of remaining blur is the largest among the amounts of remaining blur that can be removed by the plurality of image blur correction means, and the second adjustment value for making the vibration isolation characteristics of the second image blur correction means substantially equal to the vibration isolation characteristics of the first imaging means is stored for the other second imaging means. As a result, even if there are variations in the operating characteristics and the installation errors of the image blur correction means arranged on the imaging means, the amounts of remaining blur after the correction by all imaging means can be substantially the same.

A fourth aspect of the present invention provides the multi view imaging device according the third aspect, characterized by further comprising: an imaging mode switching means for switching a single-eye mode and a multi view mode; and a means for causing only the second imaging means to take an image when the imaging mode switching means switches the mode to the single-eye mode and for causing a plurality of imaging means to simultaneously take images when the imaging mode switching means switches the mode to the multi view mode, wherein in the storage means, a third adjustment value for minimizing the amount of remaining blur for the second imaging means is further stored, and the control means reads out the third adjustment value from the storage means when the imaging mode switching means switches the mode to the single-eye mode to control the image blur correction means arranged on the second imaging means based on output of the blur detection means and the read out third adjustment value and reads out the first and second adjustment values from the storage means when the imaging mode switching means switches the mode to the multi view mode to individually control the image blur correction means arranged on each of the plurality of imaging means based on output of the blur detection means and the read out first and second adjustment values.

According to the multi view imaging device of the fourth aspect, in the single-eye mode for taking an image only by the second imaging means, the image blur correction means arranged on the second imaging means is controlled based on the output of the blur detection means and the third adjustment value. In the multi view mode for simultaneously taking images by the plurality of imaging means, the image blur correction means arranged on each imaging means is controlled based on the output of the blur detection means and the first and second adjustment values. As a result, an excellent plane image with the least image blur can be acquired in the single-eye mode. Since the amounts of remaining blur of the images acquired by the imaging means are substantially the same in the multi view mode, a comfortable, excellent image that is good for eyes can be obtained.

A fifth aspect of the present invention provides the multi view imaging device according to any of the second to fourth aspects, characterized in that the storage means stores adjustment values for a pitch direction and a yaw direction. As a result, the amounts of remaining blur of the imaging means can be more accurately matched.

A sixth aspect of the present invention provides a method for correcting image blur characterized by comprising a step of detecting a vibration applied to a plurality of imaging means each constituted by an imaging element that takes a subject image and an imaging optical system that forms the subject image on the imaging element, a step of applying correction of removing an image blur of the subject image generated by the detected vibration to each of the plurality of imaging means, using image blur correction means arranged on each of the plurality of imaging means, a step of obtaining amounts of the image blur of the subject image (hereinafter, amounts of remaining blur) that cannot be removed by the correction applied in the step of applying correction of removing an image blur of the subject image to each of the plurality of imaging means, and a step of individually controlling each of the image blur correction means to make amounts of the image blur of the subject image substantially the same among the plurality of imaging means.

Advantageous Effects of Invention

According to the present invention, an excellent parallax image can be obtained by reducing differences between vibration isolation characteristics caused by characteristic differences in optical systems or vibration isolation mechanisms.

DESCRIPTION OF EMBODIMENTS

Hereinafter, details of an embodiment of a multi view imaging device according to the present invention will be described with reference to the attached drawings.

Figure 1:
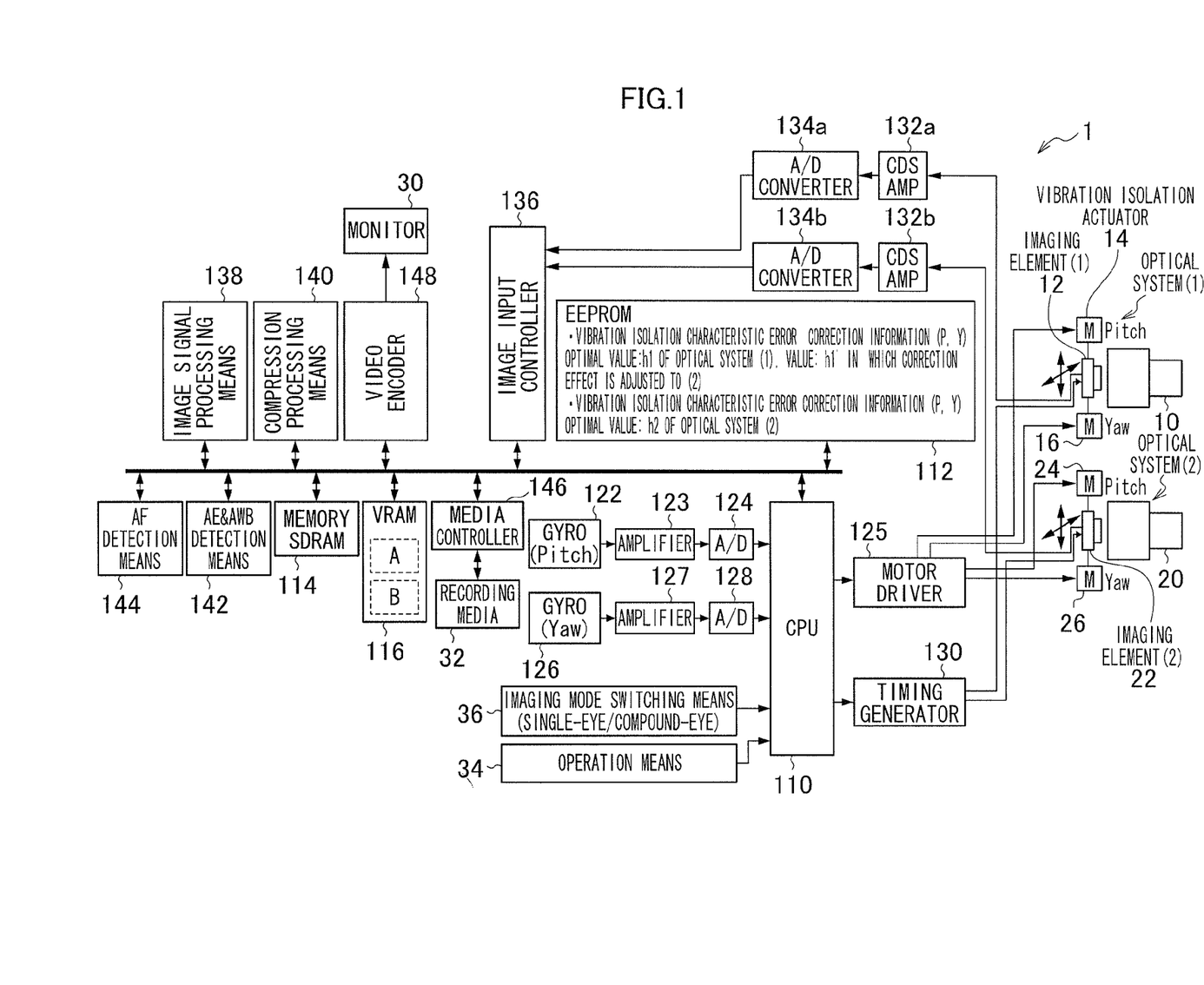
FIG. 1 is a block diagram showing an electrical configuration of a multi view digital camera 1.

FIG. 1 is a block diagram showing an electrical configuration of a multi view digital camera 1 according to a first embodiment of the multi view imaging device. The multi view digital camera 1 is a multi view digital camera 1 comprising a plurality of (two are illustrated in FIG. 1) imaging systems. The multi view digital camera 1 is capable of taking plane images and parallax images (such as stereoscopic images) and is capable of recording and reproducing moving images, still images, and sounds. Not only plane images, but also parallax images can be taken for the moving images and the still images.

The multi view digital camera 1 mainly comprises an optical system (1) (a lens unit (1) 10 and an imaging element (1) 12), an optical system (2) (a lens unit (2) 20 and an imaging element (2) 22), a monitor 30, operation means 34, imaging mode switching means 36, a CPU 110, an EEPROM 112, an SDRAM 114, a VRAM 116, vibration isolation means 120, a timing generator (TG) 130, analog signal processing means 132a and 132b, A/D converters 134a and 134b, an image input controller 136, image signal processing means 138, compression/expansion processing means 140, AE/AWB detection means 142, AF detection means 144, a media controller 146, and a video encoder 148.

The optical system (1) that forms an image for right eye and the optical system (2) that forms an image for left eye are arranged side by side so that the lens optical axes are parallel or so that the lens optical axes form a predetermined angle. The CPU 110 controls the operations of the optical system (1) and the optical system (2). Although the optical system (1)

and the optical system (2) basically operate together, the optical system (1) and the optical system (2) may operate individually.

Each of the lens unit (1) 10 and the lens unit (2) 20 comprises an aperture, a focus lens group, and the like. When the multi view digital camera 1 is powered on, covers (not shown) arranged on the front sides of the lens unit (1) 10 and the lens unit (2) 20 open, and subject light enters the lens unit (1) 10 and the lens unit (2) 20.

The imaging element (1) 12 and the imaging element (2) 22, which are CCD-type or CMOS-type image sensors, receive the subject light formed by the lens unit (1) 10 and the lens unit (2) 20 and accumulate light charges according to the amounts of received light on light receiving elements. The TG 130 controls the operations of the imaging element (1) 12 and the imaging element (2) 22.

The monitor 30 has a typical aspect ratio of 4:3 and is constituted by a liquid crystal display capable of color display. The monitor 30 is used as an image display panel for displaying taken images in a reproduction mode and is used as a photographer interface display panel for various setting operations. A live view image is displayed as necessary in an imaging mode, and the monitor 30 is used as an electronic finder for checking the angle of view. In a multi view mode, images taken by the optical system (1) are displayed on the right side, and images taken by the optical system (2) are displayed on the left side, next to each other.

The operation means 34 comprises a mode dial, a release switch, a power button, zoom buttons, a BACK button, a MENU/OK button, a DISP button, a BACK button, arrow buttons, and the like.

The mode dial functions as switching means for switching the reproduction mode and the imaging mode of the multi view digital camera 1 and is rotatable between a "reproduction position" and an "imaging position". The multi view digital camera 1 is set to the reproduction mode when the mode dial is positioned at the "reproduction position" and is set to the imaging mode when the mode dial is positioned at the "imaging position". The mode dial is used to switch various modes (such as imaging mode, reproduction mode, deletion mode, and edit mode) and to set the imaging mode, such as automatic imaging and manual imaging.

The release switch is constituted by a two-stroke switch including so-called "half press" and "full press". The multi view digital camera 1 executes imaging preparation processes, such as AE (Automatic Exposure), AF (Auto Focus), and AWB (Automatic White Balance) processes, when the release switch is half-pressed during still image photographing (for example, when a still image photographing mode is selected by the mode dial or when the still image photographing mode is selected from the menu) and executes imaging/recording processes of images when the release switch is full-pressed. The multi view digital camera 1 starts taking moving images when the release switch is full-pressed during moving image photographing (for example, when the moving image photographing mode is selected by the mode dial or when the moving image photographing mode is selected from the menu) and ends taking images when the release switch is full-pressed again. By the setting, it can be configured to take the moving images while the release switch is full-pressed and to end the imaging when the full-press is released. A shutter button dedicated to the still image photographing and a shutter button dedicated to the moving image photographing may also be arranged.

The power button functions as a power switch of the multi view digital camera 1, and the power is turned on/off when the power button is pressed.

The zoom buttons are used for zoom operations of the lens unit (1) 10 and the lens unit (2) 20 and comprise a zoom tele button for instructing zooming to the telephoto side and a zoom wide button for instructing zooming to the wide-angle side.

The MENU/OK button is used to call up the menu screen (MENU function) and is used for confirmation of the selection, instruction of the execution of a process, and the like (OK function). Allocated functions are switched according to the setting state of the multi view digital camera 1. For example, all adjustment items included in the multi view digital camera 1 are set on the menu screen, such as image quality adjustment of exposure value, hue, ISO sensitivity, the number of recording pixels, and the like, setting of a self-timer, switching of the photometry system, and whether to use the digital zooming. The multi view digital camera 1 operates in accordance with the conditions set on the menu screen.

The DISP button is used to input a switching instruction and the like of the display content of the monitor 30, and the BACK button is used to input an instruction of cancelling or the like of the input operation.

The arrow buttons are buttons for setting or selecting various menus or for zooming. The arrow buttons can be pressed and operated in vertical and horizontal four directions, and functions corresponding to the setting state of the camera are allocated to the buttons in each direction. For example, during imaging, a function for switching ON/OFF of the macro function is allocated to a left button, and a function for switching the stroboscopic mode is allocated to a right button. A function for changing the brightness of the monitor 30 is allocated to an up button, and a function for switching ON/OFF of the self-timer is allocated to a down button. During reproduction, a frame-forward function is allocated to the right button, and a frame-back function is allocated to the left button. A function for switching the brightness of the monitor 30 is allocated to the up button, and a function for deleting a reproduced image is allocated to the down button. During various settings, a function for moving the cursor displayed on the monitor 30 in the directions of the buttons is allocated.

The imaging mode switching means 36 switches the setting of a single-eye mode for taking a plane image using one desired optical system and a multi view mode for taking a parallax image using all optical systems. The information switched by the imaging mode switching means 36 is inputted to the CPU 110, and the CPU 110 controls the drive of the optical system (1) and the optical system (2).

The CPU 110 functions as control means for comprehensively controlling the entire operation of the multi view digital camera 1 and functions as calculation means for executing various calculation processes. The CPU 110 controls the components of the multi view digital camera 1 in accordance with predetermined programs based on input from the operation means 34, the imaging mode switching means 36, and the like.

The EEPROM 112 records, in advance, vibration isolation characteristic error correction information (adjustment values in a pitch direction and a yaw direction) for the optical system (1) and the optical system (2). The vibration isolation characteristic error correction information will be described in detail later.

The SDRAM 114 records, in advance, firmware that is a control program executed by the CPU 110, various data necessary for the control, camera setting values, and the like.

The VRAM 116 is used as a working area of the CPU 110 and is used as a temporary storage area of image data.

The vibration isolation means 120 detects the vibration of the multi view digital camera 1 by gyro sensors 122 and 126 and moves the imaging element (1) 12 and the imaging element (2) 22 in the opposite direction of the vibration of the multi view digital camera 1 to correct the image blur of the subject image formed on the imaging element (1) 12 and the imaging element (2) 22.

Figure 2:
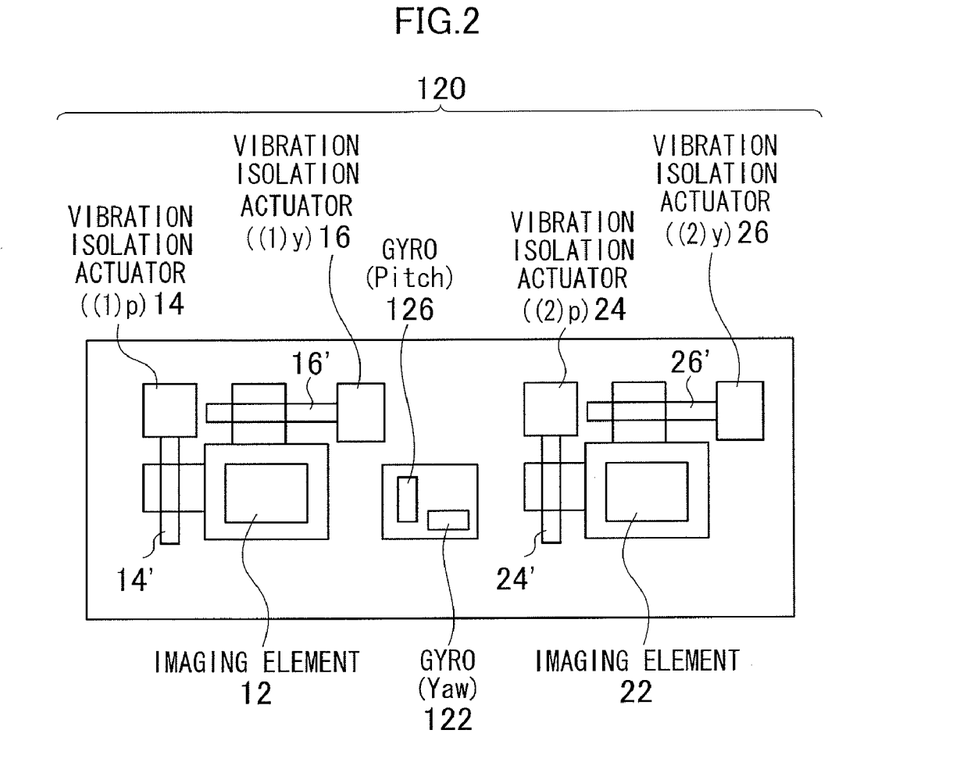
FIG. 2 is a diagram showing an outline of a configuration of vibration isolation means 120.

As shown in FIG. 2, the vibration isolation means 120 mainly comprises the gyro sensors 122 and 126, amplifiers 123 and 127, A/D converters 124 and 128, a motor driver 125, and vibration isolation actuators 14, 16, 24, and 26.

The vibration isolation actuators 14, 16, 24, and 26 are driven in accordance with a signal outputted from the motor driver 125 and move the imaging element (1) 12 or the imaging element (2) 22 through drive mechanisms 14', 16', 24', and 26' attached to output axes of the vibration isolation actuators 14, 16, 24, and 26, respectively. The vibration isolation actuators 14 and 16 move the imaging elements (1) 12, and the vibration isolation actuators 24 and 26 move the imaging element (2) 22. The vibration isolation actuators 14 and 24 move the imaging element (1) 12 and the imaging element (2) 22 in the pitch direction, respectively, and the vibration isolation actuators 16 and 26 move the imaging element (1) 12 and the imaging element (2) 22 in the yaw direction, respectively. As a result, the imaging element (1) 12 and the imaging element (2) 22 can be moved to arbitrary positions and in arbitrary directions.

The gyro sensors 122 and 126 are sensors that detect the angular velocity of the multi view digital camera 1 and detect the vibration of the multi view digital camera 1 caused by camera shake. The gyro sensor 122 detects the acceleration in the pitch direction, and the gyro sensor 126 detects the acceleration in the yaw direction.

The gyro sensors 122 and 126 are shared by the imaging element (1) 12 and the imaging element (2) 22. Therefore, the gyro sensors 122 and 126 are arranged at substantially equidistant positions (for example, substantially the center) from the imaging element (1) 12 and the imaging element (2) 22. As the gyro sensors 122 and 126 are shared, variations in the corrections of the image blur of the subject image due to variations in the outputs or the like of the gyro sensors can be eliminated. The information detected by the gyro sensors 122 and 126 is amplified by the amplifiers 123 and 127, respectively, converted to digital signals by the A/D converters 124 and 128, and inputted to the CPU 110. The CPU 110 uses the adjustment values recorded in the EEPROM 112 to amplify the signals inputted from the gyro sensors 122 and 126 and outputs the signals to the motor driver 125.

The adjustment values will be described here. The adjustment values are error adjustment values for adjusting an error of an amount of remaining blur of the image blur of the subject image taken by the imaging element (1) 12 and the imaging element (2) 22, the error caused by differences between the vibration isolation characteristics of the optical system (1) and the optical system (2). The adjustment value is set for each optical system and is set in the pitch direction and the yaw direction, in other words, for each of the vibration isolation actuators 14, 16, 24, and 26 and the drive mechanisms 14', 16', 24', and 26'. When predetermined signals are inputted from the gyro sensors 122 and 126, if signals obtained by changing the amplification factors for the predetermined signals are inputted to the vibration isolation actuators 14 and 16 as well as 24 and 26, respectively, to correct the image blur of the subject images taken by the imaging element (1) 12 and the imaging element (2) 22, the amount of remaining blur of the image blur of the subject image taken by the imaging element (1) 12 and the imaging element (2) 22 changes due to the vibration isolation characteristics (such as installation errors of the vibration isolation actuators 14, 16, 24, and 26, the imaging element (1) 12, the imaging element (2) 22, the gyro sensors 122 and 126, the vibration isolation actuators 14, 16, 24, and 26, and the like and variations in the operating characteristics (responsibility) of the vibration isolation actuators 14, 16, 24, and 26). The values for adjusting the amount of remaining blur of the image blur of the subject image generated by the differences in the vibration isolation characteristics are the adjustment values.

Figure 6A:
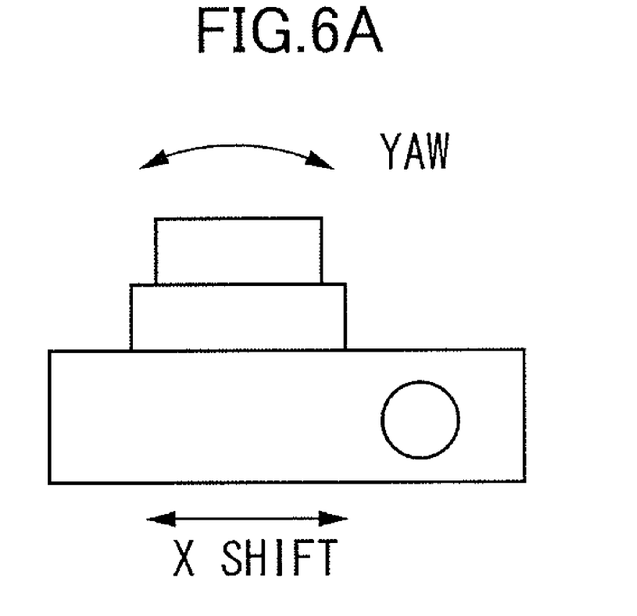
FIG. 6A is a diagram showing an example of setting of yaw directions.
Figure 6B:
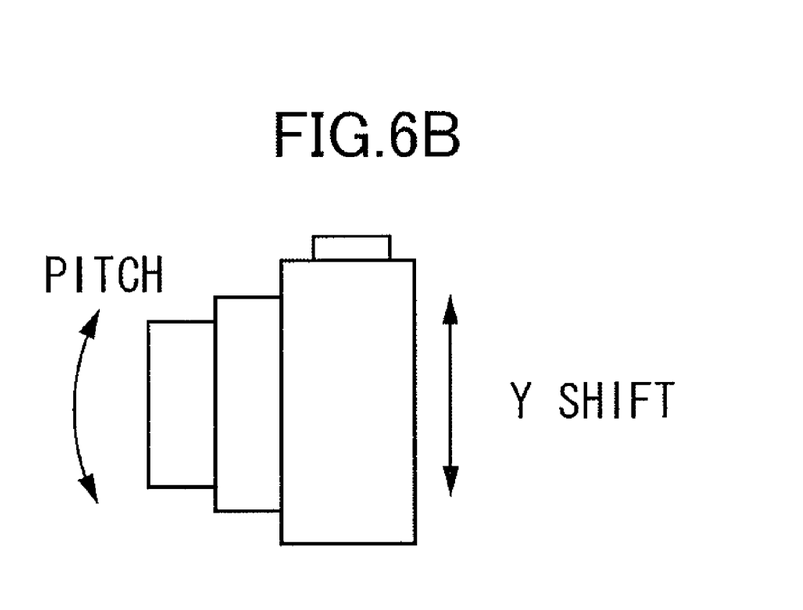
FIG. 6B is a diagram showing an example of setting of pitch direction.

In the present embodiment, the pitch/yaw directions can be set as in FIGS. 6A and 6B.

Figure 3:
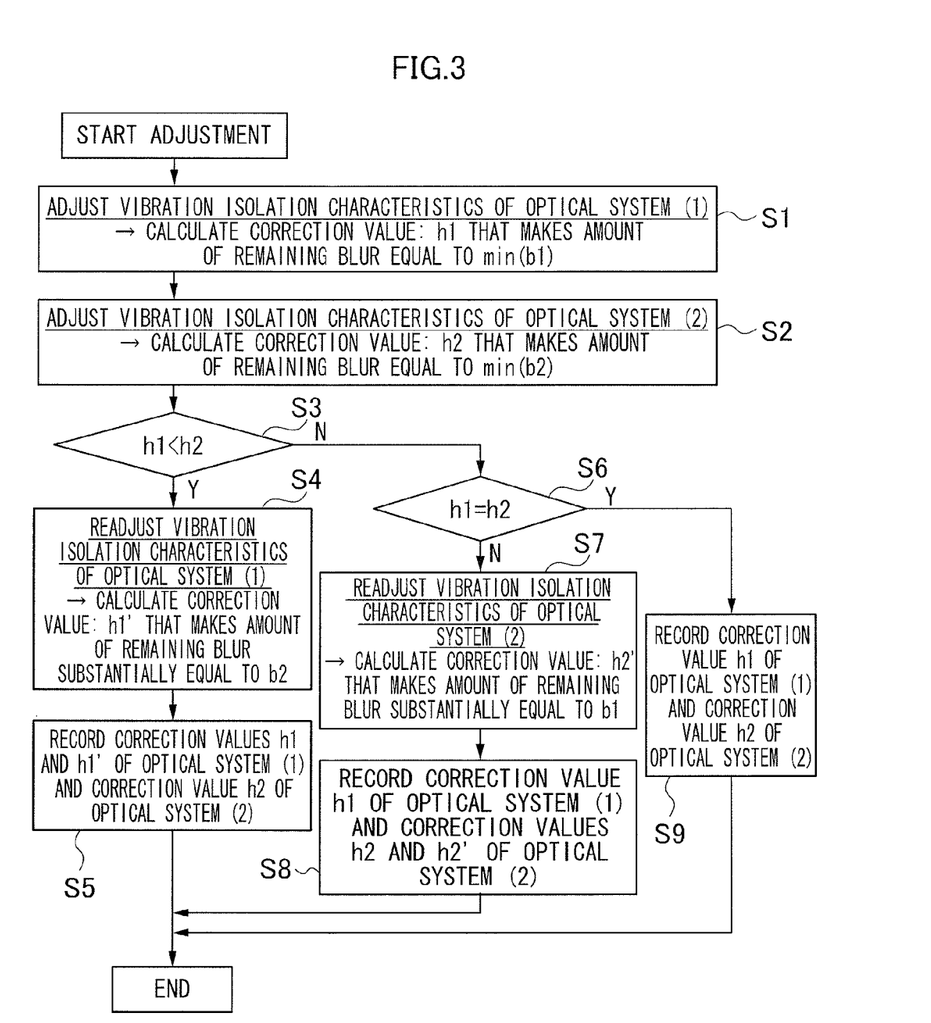
FIG. 3 is a flow chart showing a flow of a series of processes of a recording process of an adjustment value.
Figure 4:
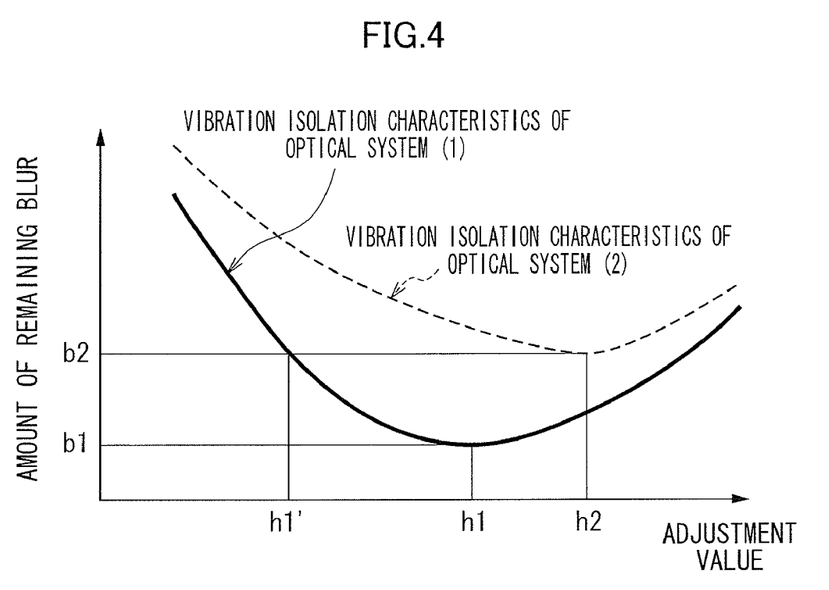
FIG. 4 is a diagram explaining vibration isolation characteristics.

FIG. 3 is a flow chart showing a flow of a process of calculating the vibration isolation characteristic error correction information and recording the information in the EEPROM 112. FIG. 4 is a diagram explaining the vibration isolation characteristics. The process shown in FIG. 3 is executed in the production of the multi view digital camera 1. Therefore, the photographer performs the imaging operation using the multi view digital camera 1 including necessary adjustment values recorded in advance in the EEPROM 112. The CPU 110 may execute the process shown in FIG. 3. Other control means may be used to execute the process.

An optimal value of the optical system (1) is calculated (step S1). A vibration is applied to the optical system (1), the amount of remaining blur in the subject image obtained by the imaging element (1) 12 is obtained while changing the adjustment value for the optical system (1), and an adjustment value that makes the vibration isolation characteristics of the optical system (1) optimal, in other words, an adjustment value h1 with a minimum amount of remaining blur b1 (see the solid line of FIG. 4), is calculated as the optimal value in the optical system (1).

An optimal value of the optical system (2) is calculated (step S2). The same vibration as the vibration applied to the optical system (1) in step 1 is applied to the optical system (2), the amount of remaining blur in the subject image obtained by the imaging element (2) 22 is obtained while changing the adjustment value for the optical system (2), and an adjustment value that makes the vibration isolation characteristics of the optical system (2) optimal, in other words, an adjustment value h2 with a minimum amount of remaining blur b2 (see the dotted line of FIG. 4), is calculated as the optimal value in the optical system (2).

Whether the optimal value of the optical system (1) is smaller than the optimal value of the optical system (2) is determined (step S3). If the optimal value of the optical system (1) is smaller than the optimal value of the optical system (2), in other words, if the vibration isolation characteristics of the optical system (1) is better than the vibration isolation characteristics of the optical system (2) as shown in FIG. 4 (Yes in step S3), the same vibration as the vibration in step 1 is applied again to the optical system (1) with the better vibration isolation characteristics, the amount of remaining blur in the subject image obtained by the imaging element (1) 12 is obtained while changing the adjustment value for the optical system (1), and an adjustment value h1' that makes the amount of remaining blur of the optical system (1) equal to the amount of remaining blur b2, which is the same as the minimum amount of remaining blur b2 of the optical system (2) with the worse vibration isolation characteristics, is calculated (step S4). The optimal value h1 and the adjustment value h1' for the optical system (1) and the optimal value h2 for the optical system (2) are set as the adjustment values in the pitch direction and the yaw direction and recorded in the EEPROM 112 (step S5). At this point, information "the adjustment values h1' and h2 will be used to correct the image blur in the multi view mode" is also recorded.

If the optimal value of the optical system (1) is not smaller than the optimal value of the optical system (2) (NO in step S3), whether the optimal value of the optical system (1) and the optimal value of the optical system (2) are equal is determined (step S6).

If the optimal value of the optical system (1) and the optimal value of the optical system (2) are not equal (NO in step S6), the vibration isolation characteristics of the optical system (2) are better than the vibration isolation characteristics of the optical system (1). Therefore, an adjustment value h2' that makes the amount of remaining blur b1 equal to the minimum amount of remaining blur b1 of the optical system (1) with the worse vibration isolation characteristics is calculated for the optical system (2) with the better vibration isolation characteristics (step S7). The optimal value h1 for the optical system (1) and the optimal value h2 and the adjustment value h2' for the optical system (2) are set as the adjustment values in the pitch direction and the yaw direction and recorded in the EEPROM 112 (step S8). At this point, information "the adjustment values h1 and h2' will be used to correct the image blur in the multi view mode" is also recorded.

If the optimal value of the optical system (1) and the optimal value of the optical system (2) are equal (YES in step S6), the optimal value h1 of the optical system (1) and the optimal value h2 of the optical system (2) are set as the adjustment values in the pitch direction and the yaw direction and recorded in the EEPROM 112 (step S9).

The process is a process of, for example, recording the adjustment values in the pitch direction. The vibration isolation characteristics in the pitch direction and the yaw direction are different, because vibration isolation actuators and drive mechanisms for correcting the image blur are different. Therefore, a similar process is separately executed for the yaw direction to record the adjustment values.

Next, the adjustment values in the single-eye mode will be described. If the optical systems with better vibration isolation characteristics are equal in the pitch direction and the yaw direction in the process shown in FIG. 3, or for example, if the optical system (1) has better vibration isolation characteristics both in the pitch direction and the yaw direction, information indicating that the optical system (1) will be used to take an image in the single-eye mode and that the optimal value h1 in the pitch direction and the optimal value h1 in the yaw direction will be used as the adjustment values to correct the image blur is recorded.

If the optical systems with better vibration isolation characteristics are different in the pitch direction and the yaw direction in the process shown in FIG. 3, or for example, if the optical system (1) has better vibration isolation characteristics in the pitch direction and the optical system (2) has better vibration isolation characteristics in the yaw direction, information indicating that the optical system with better vibration isolation characteristics will be used to take an image in the single-eye mode and that the optimal value of the optical system with better vibration isolation characteristics will be used to correct the image blur is recorded. For example, if the optimal value h1 is smaller after comparing the optimal value h1 in the yaw direction and the optimal value h2 in the pitch direction, information indicating that the optical system (1) will be used to taken an image and that the optimal value h1 in the pitch direction and the optimal value h1 in the yaw direction will be used to correct the image blur is recorded.

The method of recording the adjustment values in the single-eye mode is not limited to this. The optimal values in the pitch direction and the yaw direction of the optical system (1) and the optical system (2) may be calculated, and information indicating the optical system with better vibration isolation characteristics between the optimal values in the pitch direction or the yaw direction with worse vibration isolation characteristics will be used to take an image and that the optimal values with better vibration isolation characteristics are used to correct the image blur may be recorded.

FIG. 1 will be described again. The TG 130 controls light charge accumulation/transfer operations of the imaging element (1) 12 and the imaging element (2) 22. The electronic shutter speed (light charge accumulation time) is determined by a timing signal (clock pulse) inputted from the TG 130. The imaging element (1) 12 and the imaging element (2) 22 acquire image signals of one screen every predetermined period in the imaging mode. The image signals outputted from the imaging element (1) 12 and the imaging element (2) 22 are inputted to the analog signal processing means 132*a* and 132*b*, respectively.

The analog signal processing means 132*a* and 132*b* apply correlated double sampling processes (processes of obtaining accurate pixel data by calculating a difference between the feed-through component level and the pixel signal component level included in the output signal of each pixel of the imaging elements to reduce the noise (particularly, thermal noise) and the like included in the output signals of the imaging elements) to the image signals outputted from the imaging element (1) 12 and the imaging element (2) 22, respectively, and amplify and output the image signals.

The A/D converters 134*a* and 134*b* convert the inputted image data from analog to digital. Through the A/D converters 134*a* and 134*b*, the image signal of the imaging element (1) 12 is outputted as image data for right eye, and the image signal of the imaging element (2) 22 is outputted as image data for left eye.

The image input controller 136 includes a line buffer of a predetermined capacity, and in accordance with a command from the CPU 110, accumulates image signals of one image outputted from the A/D converter 134 and records the image signals in the VRAM 116.

The image signal processing means 138 comprises a synchronization circuit (processing circuit that interpolates spatial gaps of the color signals associated with the single-plate CCD color filter array to convert the color signals to a synchronization system), a white balance correction circuit, a gamma correction circuit, a contour correction circuit, a luminance/color difference signal generation circuit, and the like. In accordance with a command from the CPU 110, the image signal processing means 138 applies required signal processing to the image data for right eye and the image data for left eye inputted from the A/D converters 134*a* and 134*b* to generate image data (YUV data) including luminance data (Y data) and color difference data (Cr, Cb data) and outputs the image data to the video encoder 148 for display. Upon use as an electronic viewfinder in the imaging mode, the generated image data is displayed on the monitor 30 as a live view image (live view) through the video encoder 148. The image signal processing means 138 converts the YC signals of the image data for right eye taken by the imaging element (1) 12 and the image data for left eye taken by the imaging element (2) 22 into video signals in a predetermined system (for example, color composite video signals of an NTSC system) and combines the video signals with stereoscopic image data for stereoscopic display by an external stereoscopic image display device or the like.

The compression/expansion processing means 140 applies a compression process in a predetermined format to the inputted image data in accordance with a command from the CPU 110 to generate compressed image data. The compression/expansion processing means 140 applies a compression process to the image data for right eye and the image data for left eye stored in the VRAM 116 in accordance with a predetermined compression format, such as JPEG for still images and MPEG2, MPEG4, or H.264 system for moving images. The compression/expansion processing means 140 stores two-dimensional image data of the still images in recording media 32 as an image file (the image file will be described in detail later) in a predetermined format, such as an Exif file. The Exif file includes an area for storing data of a main image and an area for storing data of a reduced image (thumbnail image). A predetermined size (for example, 160×120 or 80×60 pixels) of thumbnail image is generated through a narrow-down process of pixels from the data of the main image acquired by imaging and other necessary data processing. The generated thumbnail image is written in the Exif file along with the main image. Tag information, such as imaging date/time, imaging conditions, and face detection information, is attached to the Exif file.

When the release switch is half-pressed in an imaging standby state, the AE/AWB detection means 142 calculates physical quantities necessary for AE control and AWB control from an inputted image signal in accordance with a command from the CPU 110. For example, one screen is divided into a plurality of areas (for example, 16×16) as a physical quantity necessary for the AE control, and integrated values of R, G, and B image signals are calculated in each divided area. The CPU 110 detects the brightness of the subject (subject luminance) based on the integrated values obtained from the AE/AWB detection means 142 and calculates an exposure value (imaging EV value) suitable for imaging. An aperture value and a shutter speed are determined from the calculated imaging EV value and a predetermined program diagram.

The AE/AWB detection means 142 divides one screen into a plurality of areas (for example, 16×16) as a physical quantity necessary for the AWB control and calculates an average integrated value of each color of the R, G, and B image signals in each divided area. The CPU 110 obtains ratios of R/G and B/G in each divided area from the obtained integrated value of R, integrated value of B, and integrated value of G and determines the light source type based on distributions and the like of the obtained values of R/G and B/G in the color space of R/G and B/G. In accordance with white balance adjustment values suitable for the determined light source type, gain values (white balance adjustment values) of a white balance adjustment circuit for the R, G, and B signals are determined so that, for example, values of the ratios are about 1 (therefore, the integration ratios of RGB in one screen are R:G:B≈1:1:1).

When the release switch is half-pressed in the imaging standby state, the AF detection means 144 calculates the physical quantity necessary for the AF control from the inputted image signal in accordance with a command from the CPU 110. In the multi view digital camera 1 of the present embodiment, the AF control is performed based on the contrast (so-called contrast AF) of the images obtained from the imaging element (1) 12 and the imaging element (2) 22, and the AF detection means 144 calculates a focus evaluation value indicating the sharpness of the image from the inputted image signal. The CPU 110 detects the position where the focus evaluation value calculated by the AF detection means 144 is the maximum and moves the focus lens group to the position. More specifically, the CPU 110 moves the focus lens group from the closest range to the infinity by predetermined steps to acquire the focus evaluation value at each point and sets the position with the maximum obtained focus evaluation value as the focal position to move the focus lens group to the position.

The media controller 146 records the image data compressed by the compression/expansion processing means 140 in the recording media 32 or other recording media connected through the media controller 146. The recording media 32 are various recording media, such as a semiconductor memory card represented by xD-Picture Card (registered trademark) and Smart Media (registered trademark) attachable and detachable to and from the multi view digital camera 1, a portable compact hard disk, a magnetic disk, an optical disk, and a magneto-optical disk.

The video encoder 148 outputs the RGB signals outputted from the image signal processing means 138 to the monitor 30.

A power battery that can be removed is arranged on the multi view digital camera 1. The power battery is constituted by a rechargeable secondary battery, such as a NiCad battery, a nickel-metal hydride battery, and a lithium ion battery. The power battery may be constituted by a non-rechargeable primary battery, such as a lithium battery and an alkaline battery. The power battery is loaded on a battery chamber not shown to be electrically connected to the means of the multi view digital camera 1.

Figure 5:
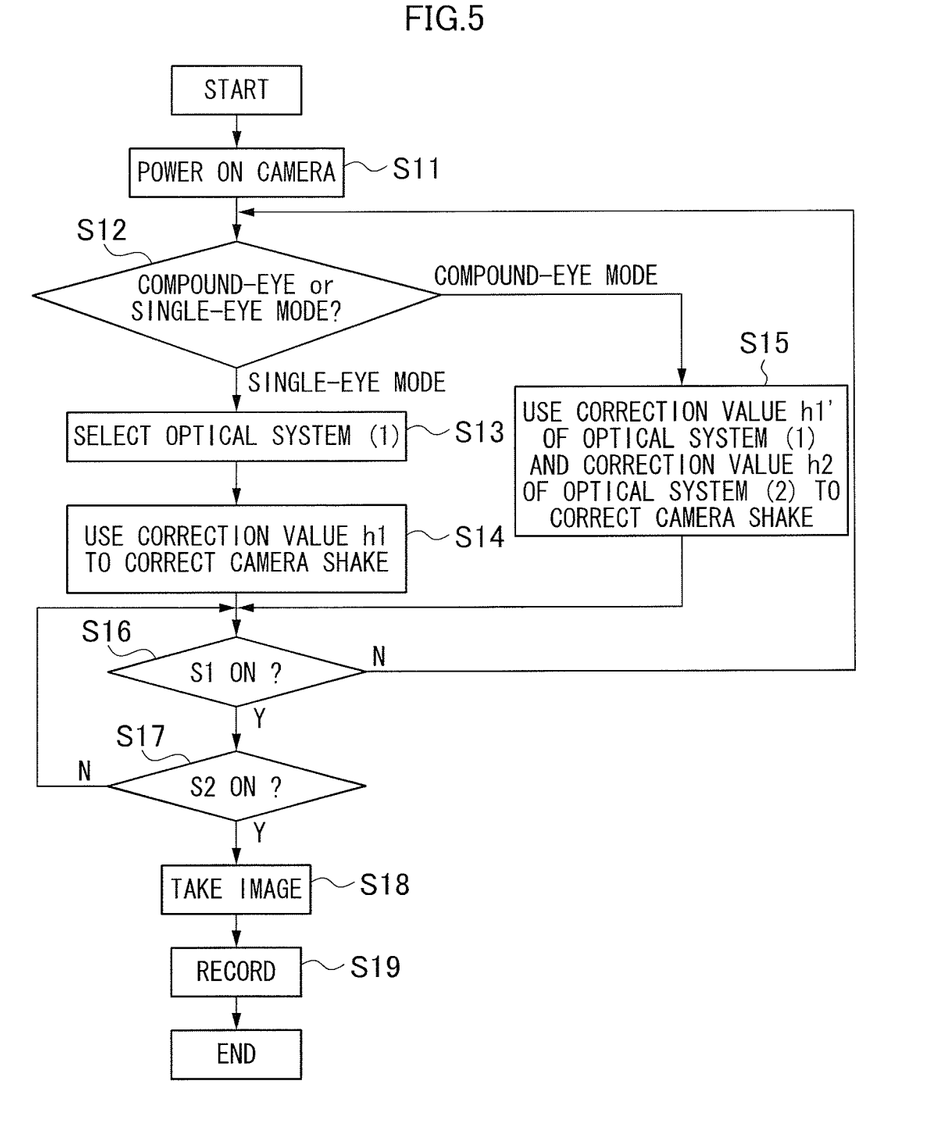
FIG. 5 is a flow chart showing a flow of a series of processes of an image process.

Operations of imaging, recording, reproducing, and editing by the multi view digital camera 1 configured as described above will be described. FIG. 5 is a flow chart showing a flow of an imaging preparation process. The CPU 110 mainly executes the following process.

When the power button is pressed to power on the multi view digital camera 1, the digital camera 1 is activated in the imaging mode (step S11) to determine which imaging mode, the single-eye mode or the multi view mode, is set (step S12).

If the single-eye mode is set, the optical system (1), which is the optical system with better vibration isolation characteristics in the present embodiment, is selected (step S13). The imaging element (1) 12 of the optical system (1) selected in step S13 starts imaging for live view image. More specifically, the imaging element (1) 12 consecutively takes images, and the image signals are consecutively processed to generate image data for live view image. The generated image data is sequentially added to the video encoder 148, converted to a signal format for display, and outputted to the monitor 30.

After the start of the live view imaging, the gyro sensors 122 and 126 detect a vibration (such as camera shake) applied to the multi view digital camera 1 and correct the image blur of the subject image taken by the imaging element (1) 12 (step S14). More specifically, the vibrations in the pitch direction and the yaw direction detected by the gyro sensors 122 and 126 are inputted to the CPU 110 through the amplifiers 123 and 127 as well as the A/D converters 124 and 128, respectively. The CPU 110 uses the adjustment value h1 to amplify the signal inputted from the gyro sensor 122 and drives the vibration isolation actuator 14 through the motor driver 125. At the same time, the CPU 110 uses the adjustment value h1 to amplify the signal inputted from the gyro sensor 126 and drives the vibration isolation actuator 16 through the motor driver 125. This allows an optimal vibration isolation operation for the optical system (1), and as a result, the image blur of the subject image taken by the imaging element (1) 12 is corrected.

If the multi view mode is set, the imaging element (1) 12 and the imaging element (2) 22 start the imaging for live view image. More specifically, the imaging element (1) 12 and the imaging element (2) 22 consecutively take images, and the image signals are consecutively processed to generate image data for live view image. The generated image data is sequentially added to the video encoder 148, converted to a signal format for display, and outputted to the monitor 30.

After the start of the live view imaging, the gyro sensors 122 and 126 detect a vibration (such as camera shake) applied to the multi view digital camera 1 and correct the image blur of the subject images taken by the imaging element (1) 12 and the imaging element (2) 22 (step S15). More specifically, the vibrations in the pitch direction and the yaw direction detected by the gyro sensors 122 and 126 are inputted to the CPU 110 through the amplifiers 123 and 127 and the A/D converters 124 and 128, respectively. The CPU 110 uses the adjustment value h1' to amplify the signal inputted from the gyro sensor 122 and drives the vibration isolation actuator 14 through the motor driver 125. At the same time, the CPU 110 uses the adjustment value h1' to amplify the signal inputted from the gyro sensor 126 and drives the vibration isolation actuator 16 through the motor driver 125.

The CPU 110 also uses the adjustment value h2 to amplify the signal inputted from the gyro sensor 122 and drives the vibration isolation actuator 24 through the motor driver 125. At the same time, the CPU 110 uses the adjustment value h2 to amplify the signal inputted from the gyro sensor 126 and drives the vibration isolation actuator 26 through the motor driver 125.

This allows appropriate vibration isolation operations for the optical system (1) and the optical system (2), and as a result, the amount of remaining blur of the subject image obtained by the imaging element (1) 12 and the amount of remaining blur of the subject image obtained by the imaging element (2) 22 can be substantially the same.

Whether the shutter button is half-pressed, in other words, whether an S1 ON signal is inputted to the CPU 110, is determined (step S16). If the S1 ON signal is not inputted (NO in step S16), steps S12 to S15 are executed again. If the S1 ON signal is inputted (YES in step S16), the imaging preparation processes, in other words, the AE, AF, and AWB processes, are executed in response to the S1 ON signal.

Whether the shutter button is full-pressed, in other words, whether an S2 ON signal is inputted to the CPU 110, is determined (step S17). If the S2 ON signal is not inputted (NO in step S17), step S16 is executed again. If the S2 ON signal is inputted (YES in step S17), the following imaging process (step S18) and recording process (step S19) are executed in response to the S2 ON signal.

The imaging element (1) 12 and the imaging element (2) 22 are exposed based on the aperture value and the shutter speed obtained in the AE process to take an image for recording. The image signals for recording outputted from the imaging element (1) 12 and the imaging element (2) 22 are imported to the image signal processing means 138 and stored in the VRAM 116. The image signals stored in the VRAM 116 are added to the image signal processing means 138 under the control of the CPU 110. The image signal processing means 138 applies predetermined signal processing to the inputted image signal to generate image data (YUV data) including luminance data and color difference data.

The image data generated by the image signal processing means 138 is temporarily stored in the VRAM 116 and then added to the media controller 146. The media controller 146 applies predetermined compression processing to the inputted image data to generate compressed image data.

The compressed image data is stored in the VRAM 116 and recorded in the recording media 32 through the media controller 146 as a still image file (for example, Exif) in a predetermined format.

According to the present embodiment, the amounts of remaining blur of the subject images taken by a plurality of optical systems can be matched to correct the image blur, even if there are variations in the operation characteristics or installation errors in the gyro sensors, actuators, and the like.

Therefore, in the observation of a plurality of subject images as a stereoscopic image, a comfortable, excellent image that is good for eyes can be obtained. The error can also be reduced in the calculation of distance information from a parallax image.

In the imaging of a plane image, an optical system with the best vibration isolation characteristics among a plurality of optical systems can be used, and an adjustment value with the greatest vibration isolation effect can be applied to correct the image blur. Therefore, an excellent image with a small amount of remaining blur can be taken.

The adjustment values h1, h1', and h2 are recorded in the EEPROM 112, because the single-eye mode and the multi view mode are included in the present embodiment. However, only the adjustment values h1 and h2 may be recorded when only the multi view mode is included.

Although the image blur is corrected by moving the imaging element (1) 12 and the imaging element (2) 22 in the present embodiment, the image blur may be corrected by moving the optical elements included in the lens unit (1) 10 and the lens unit (2) 20.

Since the image blur is mechanically corrected in the present embodiment, the image blur is corrected in accordance with the optical system with worse vibration isolation characteristics. However, an electrical correction can also be used together to correct the image blur in accordance with the optical system with better vibration isolation characteristics. More specifically, the adjustment value h1 is used for the optical system (1) to correct the image blur, and the adjustment value h2 is used for the optical system (2) to correct the image blur. As a result, the amount of remaining blur of the subject image taken by the optical system (1) becomes b1, and the amount of remaining blur of the subject image taken by the optical system (2) becomes b2. Subsequently, image processing is applied to the subject image taken by the optical system (2) so that the amount of remaining blur becomes b1. As a result, the amounts of remaining blur of the images taken by the optical systems can be matched also in the multi view mode, and an excellent photographed image with a little image blur can be obtained as in the single-eye mode.

Although the gain compensation has been described in the present embodiment, the present invention can be applied not only to the gain compensation, but also to phase compensation.

Although the present embodiment has illustrated an example of two imaging systems (the optical system (1) and the optical system (2)), there may be three or more imaging systems. The imaging systems may be two-dimensionally arranged, instead of the horizontal linear arrangement. The multi view digital camera 1 of FIG. 1 is capable of not only the stereoscopic imaging, but also of multi-view imaging and imaging in all directions.

The present invention can be applied not only to the digital camera, but can be similarly applied to an imaging device, such as a cell phone with camera and a video camera, and an electronic device, such as a portable music player and a PDA.

REFERENCE SIGNS LIST

1 . . . multi view digital camera
10 . . . lens unit (1)
12 . . . imaging element (1)

14, 16, 24, 26 ... vibration isolation actuators
20 ... lens unit (2)
22 ... imaging element (2)
36 ... imaging mode switching means
110 ... CPU
112 ... EEPROM
120 ... vibration isolation means
122, 126 ... gyro sensors
125 ... motor driver

The invention claimed is:

1. A multi view imaging device characterized by comprising:
   a plurality of imaging means, each comprising an imaging element that takes a subject image and an imaging optical system that forms the subject image on the imaging element;
   a blur detection means for detecting a vibration applied to the imaging means;
   image blur correction means, arranged on each of the plurality of imaging means, for applying a correction of removing an image blur of the subject image generated by the vibration detected by the blur detection means to each of the plurality of imaging means, wherein an amount of blur that cannot be removed by respective image blur correction means corresponds to an amount of remaining blur; and
   a control means for individually controlling each of the image blur correction means to make the amount of remaining blur substantially the same among the plurality of imaging means.

2. The multi view imaging device according to claim 1, characterized in that
   the control means includes a storage means for storing a preset adjustment value for each of the imaging means, the storage means for storing the adjustment value for reducing the amount of remaining blur of each of the imaging means, and controls each of the plurality of image blur correction means based on output of the blur detection means and the adjustment values of each of the imaging means stored in the storage means.

3. The multi view imaging device according to claim 2, characterized in that
   in the storage means,
   a first adjustment value for minimizing the amount of remaining blur is stored for a first imaging means in which the amount of remaining blur is the largest among the plurality of imaging means, and
   a second adjustment value for making vibration isolation characteristics of the second image blur correction means substantially equal to vibration isolation characteristics of the first imaging means is stored for a second imaging means other than the first imaging means.

4. The multi view imaging device according to claim 3, characterized by further comprising:
   an imaging mode switching means for switching a single-eye mode and a multi view mode; and
   a means for causing only the second imaging means to take an image when the imaging mode switching means switches the mode to the single-eye mode and for causing a plurality of imaging means to simultaneously take images when the imaging mode switching means switches the mode to the multi view mode, wherein
   in the storage means, a third adjustment value for minimizing the amount of remaining blur for the second imaging means is further stored, and
   the control means
   reads out the third adjustment value from the storage means when the imaging mode switching means switches the mode to the single-eye mode to control the image blur correction means arranged on the second imaging means based on output of the blur detection means and the read out third adjustment value, and
   reads out the first and second adjustment values from the storage means when the imaging mode switching means switches the mode to the multi view mode to individually control the image blur correction means arranged on each of the plurality of imaging means based on output of the blur detection means and the read out first and second adjustment values.

5. The multi view imaging device according to claim 2, characterized in that
   the storage means stores adjustment values for a pitch direction and a yaw direction.

6. The multi view imaging device according to claim 3, characterized in that
   the storage means stores adjustment values for a pitch direction and a yaw direction.

7. The multi view imaging device according to claim 4, characterized in that
   the storage means stores adjustment values for a pitch direction and a yaw direction.

8. A method for correcting image blur characterized by comprising:
   a step of detecting a vibration applied to a plurality of imaging means each constituted by an imaging element that takes a subject image and an imaging optical system that forms the subject image on the imaging element;
   a step of applying correction of removing an image blur of the subject image generated by the detected vibration to each of the plurality of imaging means, using image blur correction means arranged on each of the plurality of imaging means, wherein an amount of blur that cannot be removed by respective image blur correction means corresponds to an amount of remaining blur;
   a step of obtaining the amount of remaining blur for each of the plurality of imaging means; and
   a step of individually controlling each of the image blur correction means to make amounts of the image blur of the subject image substantially the same among the plurality of imaging means.

* * * * *